United States Patent [19]

Eppens

[11] 4,134,005
[45] Jan. 9, 1979

[54] METHOD AND DEVICE FOR CONTROLLING THE TEMPERATURE VARIATION IN A POTTER'S OVEN

[75] Inventor: Hindrik E. H. Eppens, Groningen, Netherlands

[73] Assignee: Keramisch Instituut Haarlem, B.V., Haarlem, Netherlands

[21] Appl. No.: 760,399

[22] Filed: Jan. 18, 1977

[30] Foreign Application Priority Data

Feb. 6, 1976 [NL] Netherlands .......................... 7601252

[51] Int. Cl.² .............................................. H05B 1/02
[52] U.S. Cl. .................................... 219/413; 219/492; 219/494; 219/510; 236/46 F
[58] Field of Search ............... 219/413, 412, 414, 390, 219/508, 521, 211, 492, 494, 509, 510, 511, 449, 450, 489, 491; 13/22, 24; 236/46 F

[56] References Cited

U.S. PATENT DOCUMENTS

| | | | |
|---|---|---|---|
| 1,113,154 | 10/1914 | Copeman | 219/413 |
| 1,129,842 | 3/1915 | Blatchford | 219/300 |
| 2,023,116 | 12/1935 | Biebel | 219/413 |
| 2,220,028 | 10/1940 | Smith | 13/24 |
| 2,435,641 | 2/1948 | Weber | 219/414 |
| 3,033,968 | 5/1962 | Julie | 219/413 |
| 3,183,294 | 5/1965 | Kasper | 13/24 |
| 3,249,674 | 5/1966 | Watson | 219/414 |
| 3,342,976 | 9/1967 | Kjellberg | 219/413 |
| 3,364,338 | 1/1968 | Holtkamp | 219/412 |
| 3,404,210 | 10/1968 | Weber | 13/22 |
| 3,440,402 | 3/1969 | Holtkamp | 219/412 |

*Primary Examiner*—J. V. Truhe
*Assistant Examiner*—Bernard Roskoski
*Attorney, Agent, or Firm*—Snyder, Brown & Ramik

[57] ABSTRACT

A potter's oven includes an electrical heating element for controlling the temperature in the oven. Power to this heating element is controlled by a bimetallic switch and an electrically energized heater therefor and the percentage of power supplied to the oven heating element is controlled in dependence upon the value of resistance in series with the heater for the bimetallic switch. The value of this resistance is increased in stepwise fashion under control of at least one sensor which determines the outside wall temperature of the oven, the temperature at which the sensor responds being chosen to cause the temperature inside the oven to reach a predetermined value and to hold such value for a predetermined time.

5 Claims, 2 Drawing Figures

METHOD AND DEVICE FOR CONTROLLING THE TEMPERATURE VARIATION IN A POTTER'S OVEN

The invention relates to a method and a device for controlling the temperature variation in a potter's oven by using a programme circuitry for regulating the power fed to the heating elements. Such potter's ovens or ceramic ovens are mainly employed for making crockery. A distinction has to be made between the so-called industrial furnaces for manufacturing earthenware on an industrial scale and potter's ovens employed for educational purposes, artists and amateurs. The present invention particularly relates to the latter type.

The required temperature variation depends upon the filling of the oven, but in general it may be stated that the maximum attainable tempuratue is of the order of magnitude of 1100° C to 1300° C. This temperature should be attained in different steps, whilst the temperature can be held at a given value for a given time period before it is raised. The time required for baking earthenware lies between 4 and 12 hours. In order to remove residual water and chemically bound water it is necessary to keep the temperature constant at different values for a given time. A material deviation from the required temperature variation brings about an unsatisfactory product. Potter's ovens for amateurs are employed inter alia in schools and by private persons.

On account of the long period of time it will be obvious that even if the oven is equipped with a programme switch great attention is required from the user to ensure a correct temperature variation, since the usually manually operated programme switch has to be readjusted from time to time, for example, with intervals of half an hour to two hours, in order to attain a higher temperature. This is a serious disadvantage in schools, where baking usually takes place outside the school hours (for example overnight). Moreover, the quantity of charge of the oven is not taken into account. Such a disadvantage is also inherent in a clock-controlled switch.

There are known potter's ovens having a complicated, automatically operating, programme-controlled regulator, in which the temperature in the oven is measured and the temperature variation is regulated in accordance with a given programme. However, the costs of such a regulation are particularly high and amount to a multiple of the cost of the oven itself. These amounts are prohibitive for amateurs and educational purposes. Therefore, one manages with manual switches.

The invention has for its object to provide a method of automatically controlling the temperature of a potter's oven in accordance with a given programme. According to the invention this is achieved by measuring the temperature at an area where the temperature adapts with a delay to that in the oven, the programme circuitry being controlled on the basis of the measured value. Said place may be located on the outer side of the wall of the oven. The steps according to the invention are based on the following idea. With a given quantity of power feed a given temperature is reached in the oven. Therefore, by a stepwise increase in the quantity of power feed an increasing temperature is attained in the oven. The stepwise increase in the quantity of power feed can be carried out on the basis of a temperature measurement on the outer side of the oven, since there is a definite relationship between the temperature in the oven and that on the outer side of the oven wall. When the temperature in the oven associated with a given amount of power is attained, it will take a definite period of time before the temperature on the outer side has attained a value corresponding with the temperature in the oven. This is, of course, dependent upon the insulating properties of the wall.

For said period of time the quantity of power feed and hence the temperature in the oven remain constant. Consequently, there exists a period of time, when the temperature in the oven has attained the value associated with the quantity of power feed, whilst the temperature on the outerside of the wall slowly increases to the temperature corresponding with the inner temperature. This period of time may be utilized for the programme regulation. By determining the instant at which an increased power is fed. to the oven by means of the value of the temperature on the outer side of the wall, the period for which the temperature in the oven remains constant can be fixed. The fundamental idea is that the time required for the temperature on the outer side of the wall to attain the temperature in the oven is longer than the period of time for which the temperature in the oven has to remain at the same level.

The inventive idea described above permits of obtaining a sufficiently accurate control for this kind of oven by very simple means. The temperature may be measured by means of feelers covering each only part of the overall temperature range. Such feelers are cheap.

The invention will be described more fully with reference to the drawings in which.

Figure 1:
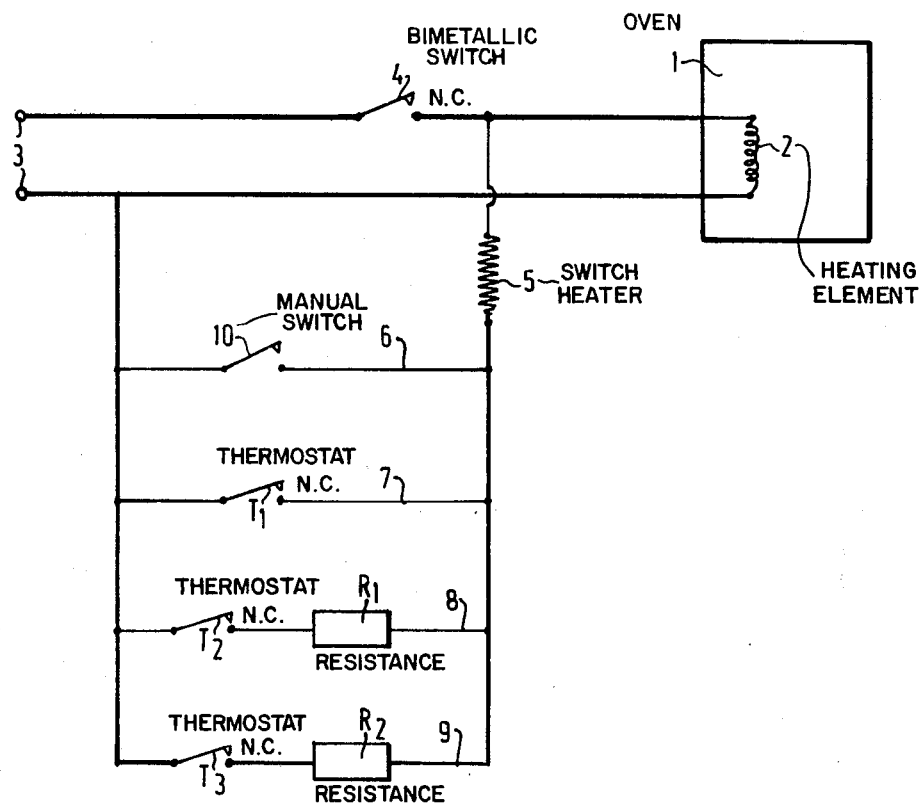
FIG. 1 is a schematic view of the invention.
Figure 2:
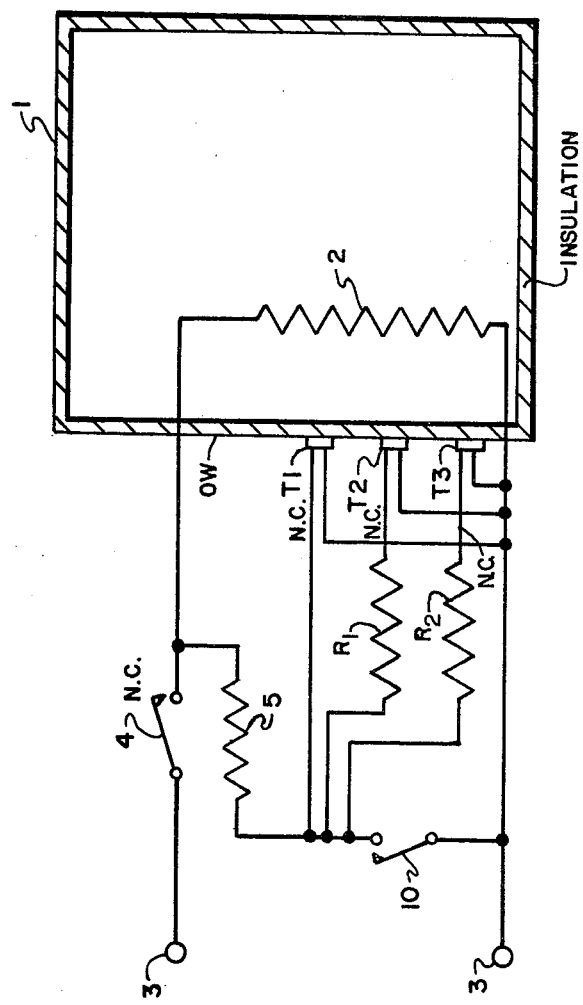
FIG. 2 is a diagrammatic view illustrating to positioning of the temperature sensors.

The potter's oven 1 is fed by means of a heating element 2 from the electric mains 3. A bimetallic switch 4 is heated by a filament wire 5 and supplies a given amount of power to the oven 1. The supply of power to the oven depends upon the fact whether and how many of the parallel branches 6, 7, 8 and 9 are switched on. If the branches 6, 7, 8 and 9 are open, the full power is fed to the oven. If one or more parallel branches are switched on, only part of the full power is fed to the oven. The thermostats T1, T2 and T3 are applied to the outer OW of the oven and switch over at a given temperature. At an increase in temperature first switch T1, then T2 and finally T3 are opened.

As noted, the switch 4 is bimetallic and responds to the heater 5 to open and close at a rate dependent upon the rate at which the heater comes up to temperature to open the switch 4. The rate at which the heater 5 comes up to the operative temperature depends upon the current flowing therethrough when the switch 4 is closed. For example, when the manual switch 10 is closed (which defeats automatic control as previously noted) and the switch 4 is also closed, the full power of the supply 3 is connected to the heater 5 and it very rapidly attains the temperature required to open the switch 4. This temperature as noted above depends of course on the proximity of the heater 5 to the switch 4. Once the switch 4 is open, no power flows to the heater 5 and it cools down until the switch 4 closes again, and this cycle repeats. Clearly, the more slowly the heater 5 heats up, the less power overall will be supplied to the heating element 2. During automatic cycling, when the switch 10 is manually opened, the thermostatic switch T1 initially operates in the same fashion as described above with respect to the switch 10, i.e., the switch T1 being closed and allowing full power flow to the heater 5 rapidly heats the latter so that minimum power flows to the element 2. Thus, the temperature to which the heater 2 can heat the interior of the oven space 1 is limited to some value controlled by the cycling of the switch 4. The switch T1 opens only when a selected outside temperature of the oven is attained, and until such outside wall temperature is attained the oven temperature remains at that value controlled by the aforesaid minimum power flow to the element 2. When the switch T1 is opened, a different cycling of the switch 4 is established because now the power flow to the heater 5 is determined by the resistances R1 and R2 in parallel. In other words, the resistance in series with the heater 5 has been increased and it of course therefore heats more slowly, leaving the switch 4 "on" for a greater length of each heating/cooling cycle. Thus, an increased power flow is applied to the oven element 2 and the oven temperature rises and holds at some value controlled by the resistances R1 and R2 in parallel until the oven surface sensing switch T2 is opened. Now the power flow to the heater 5 is at that low value determined by the resistance R2 alone and the switch 4 therefore remains closed longer during each cycle, thus increasing the net power flow to the element 2. Finally, the switch T3 opens and now there is no power flow to the heater 5 and the switch 4 remains closed continuously, thereby allowing the oven temperature to attain that highest value which can be attained by full and continuous power flow to the element 2.

The percentage of the full power supplied to the oven can be regulated in dependence upon the value of R1 and R2. As stated above, by choosing the switching points of T1, T2 and T3 the period of time is fixed for which a given part of the full power is fed to the oven and for which the temperature in the oven remains constant. It will be obvious that instead of using a stepwise temperature-control a continuous control may also be carried out. In this case the number of thermostats T may be increased or they may be assembled into an analogous indicator.

Invariably the time constant of the wall of the oven is utilized for obtaining the desired period of time for which the temperature in the oven has to remain constant.

With automatic control the manually operated switch 10 is opened. By closing the switch 10 the minimum power is fed to the oven. By varying the distance between the filament 5 and the bimetallic switch 4 the power feed to the oven can be manually regulated.

Although an ambient temperature lower than that at which the oven is adjusted may affect the external temperature of the oven, the control will operate satisfactorily even if the ambient temperature of the oven were particularly low. Consequently, through the external temperature reaches the switching point comparatively "late" and hence the inner temperature remains "longer" on a given value, this is no objection. It should be considered that baking of earthenware in such ovens is not or only hardly affected adversely by a slow increase in temperature, but rather by an excessively rapid rise in temperature.

What I claim is:

1. A potter's oven comprising, in combination:
   a housing defining an oven space adapted to receive earthenware which is to be baked;
   heating means within said oven space; and
   control means connected to said heating means for controlling the temperature to which said oven space is heated;
   said housing including at least one wall having an outer surface which is insulated with respect to said oven space whereby the temperature of said outer surface rises slowly and lags behind temperature attained within said oven space;
   said control means comprising mechanism which controls the supply of energy consumed by said heating means and means for cyclically controlling said mechanism at at least first and second rates corresponding respectively to first and second temperatures in said oven space, the means last mentioned including a temperature sensor responsive to the temperature of said outer surface to change the cycling of said mechanism from said first rate to said second rate whereby automatically to hold said oven space at said first temperature for that time required for said outer surface to attain said temperature to which said temperature sensor responds.

2. A potter's oven as defined in claim 1 wherein said mechanism comprises a bimetallic switch and said means for cyclically controlling comprises a heater for said bimetallic switch and a control circuit for varying the energy supplied to said heater, said control circuit including said temperature sensor.

3. A potter's oven comprising, in combination:
   a housing defining an oven space adapted to receive earthenware which is to be baked;
   electric heating means in said oven space;
   a source of power for said heating means and including a bimetallic switch for controlling energization of said heating means; and
   a heating circuit in parallel with said heating means for cycling said bimetallic switch on and off at different rates corresponding to at least two different temperatures within said oven space, said circuit including a heater for said bimetallic switch and at least one resistance circuit in series with said heater and including a normally closed switch which opens in response to a selected temperature;
   said housing including at least one wall having an outer surface which is insulated with respect to said oven space whereby the temperature of said outer surface rises slowly and lags behind each temperature attained within said oven space;
   said normally closed switch being responsive to the temperature of said outer surface and said selected temperature at which it opens being set automatically to attain and hold said oven space at one of said different temperatures until said outer surface reaches the temperature to which the sensor responds.

4. A potter's oven as defined in claim 3 wherein a plurality of resistance circuits are connected in parallel to each other, each including a normally closed switch which opens in response to a different temperature at said outer surface.

5. A potter's oven comprising, in combination:
   a housing defining an oven space adapted to receive earthenware to be baked;
   an electric heating element in said oven space which is capable of heating said oven space to a selected high temperature when full power is applied thereto;

a source of electric power for said heating element and a bimetallic switch connecting said source of power to said heating element; and a heating circuit for said bimetallic switch connected in parallel with said heating element, said heating circuit including a heater and at least one resistance circuit, in series with said heater and including a temperature responsive switch whereby to terminate the supply of energy to said heater when a certain temperature is sensed by said temperature responsive switch thereby to allow said bimetallic switch to remain closed;

said housing including at least one wall having an outer surface insulated with respect to said oven space whereby said outer surface attains temperatures which lag behind the temperatures in said oven space, said temperature responsive switch being located to sense the temperature of said outer surface.

* * * * *